US011015589B2

(12) United States Patent
Washio et al.

(10) Patent No.: US 11,015,589 B2
(45) Date of Patent: May 25, 2021

(54) GAS SUPPLYING APPARATUS

(71) Applicant: Kobe Steel, Ltd., Hyogo (JP)

(72) Inventors: Takuya Washio, Takasago (JP);
Koichiro Hashimoto, Takasago (JP);
Daisuke Wada, Takasago (JP); Kenji Nagura, Takasago (JP); Akitoshi Fujisawa, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 176 days.

(21) Appl. No.: 16/161,563

(22) Filed: Oct. 16, 2018

(65) Prior Publication Data
US 2019/0128265 A1 May 2, 2019

(30) Foreign Application Priority Data
Nov. 2, 2017 (JP) .............................. JP2017-212673

(51) Int. Cl.
*F04B 39/12* (2006.01)
*F04B 39/06* (2006.01)

(52) U.S. Cl.
CPC .......... *F04B 39/121* (2013.01); *F04B 39/066* (2013.01); *F04C 2210/1055* (2013.01);
(Continued)

(58) Field of Classification Search
CPC ............ F04C 29/065; F04C 2210/1055; F04C 13/007; F04B 39/0033; F04B 39/06; F04B 39/121; F04B 39/0038; F04B 39/066; F04B 2015/0822; F04B 53/06; F04B 53/08; F17C 5/007; F17C 5/06; F17C 13/025; F17C 2225/036; F17C 2227/043; F17C 2265/065; F17C 2205/0103; F17C 2223/033;
(Continued)

(56) References Cited

U.S. PATENT DOCUMENTS

| 5,643,077 A * | 7/1997 | Ayer | B05B 16/60 454/54 |
| 7,338,358 B2 * | 3/2008 | Kim | F24F 3/1603 454/252 |
| 2004/0244402 A1 * | 12/2004 | Yum | F24F 12/006 62/411 |
| 2011/0056384 A1 | 3/2011 | Kadota | |

(Continued)

FOREIGN PATENT DOCUMENTS

DE 10117791 A1 10/2002
JP S51-066151 A 6/1976
(Continued)

OTHER PUBLICATIONS

JP2011132876 translation (Year: 2020).*
JP5021195 translation (Year: 2020).*

*Primary Examiner* — Devon C Kramer
*Assistant Examiner* — David N Brandt
(74) *Attorney, Agent, or Firm* — Studebaker & Brackett PC

(57) ABSTRACT

A gas supplying apparatus includes a compressor, a housing having an exhaust port, and an exhaust duct. The housing has a circumferential wall and a top wall. The circumferential wall has an access section. The exhaust port is provided on at least one of the circumferential wall and the top wall at a location higher than the access section. The exhaust duct includes a discharge port for discharging the air, exhausted from the exhaust port, to the outside. The discharge port is opened upward or opened downward in an area overlapping the top wall in an up-and-down direction.

11 Claims, 6 Drawing Sheets

(52) U.S. Cl.
CPC .......................... *F17C 2205/0176* (2013.01);
*F17C 2221/012* (2013.01); *F17C 2223/0123*
(2013.01); *F17C 2225/0123* (2013.01); *F17C
2227/0157* (2013.01); *F17C 2227/0341*
(2013.01); *F17C 2260/042* (2013.01); *F17C
2265/065* (2013.01); *F17C 2270/0139*
(2013.01); *Y02E 60/32* (2013.01)

(58) Field of Classification Search
CPC ...... F17C 2223/0123; F17C 2227/0341; F17C
2205/0142; F17C 2227/0164; F17C
2250/0663; F17C 2205/0326; F17C
2205/0176; F17C 2225/0123; F17C
2260/037; F17C 2260/042; F17C
2270/0139; F17C 2221/012; F17C
2227/0157

See application file for complete search history.

(56) References Cited

U.S. PATENT DOCUMENTS

| | | | |
|---|---|---|---|
| 2013/0232916 A1 | 9/2013 | Utal et al. | |
| 2013/0233388 A1* | 9/2013 | Utal | F17C 13/083 137/1 |
| 2015/0240996 A1 | 8/2015 | Kapoor | |
| 2016/0146484 A1* | 5/2016 | Kwon | F24F 13/10 454/252 |

FOREIGN PATENT DOCUMENTS

| | | | | |
|---|---|---|---|---|
| JP | S63-15433 U | | 2/1988 | |
| JP | 2001-342962 A | | 12/2001 | |
| JP | 2011-058714 A | | 3/2011 | |
| JP | 2011-132876 A | | 7/2011 | |
| JP | 2011132876 | * | 7/2011 | ............. Y02E 60/32 |
| JP | 5021195 | * | 9/2012 | ............. F04B 39/06 |

* cited by examiner

GAS SUPPLYING APPARATUS

TECHNICAL FIELD

The present invention relates to a gas supplying apparatus of a hydrogen station.

BACKGROUND ART

A conventional hydrogen station for feeding hydrogen gas as a fuel to a fuel cell vehicle is known. For example, Japanese Patent Application Laid-Open No. 2011-132876 discloses a hydrogen station including a hydrogen compressing apparatus that compresses hydrogen gas, an accumulator unit that stores hydrogen gas discharged from the hydrogen compressing apparatus, a dispenser that feeds the hydrogen gas, supplied from the accumulator unit, to a tank of a fuel cell vehicle. The hydrogen compressing apparatus includes a hydrogen compressing apparatus body, a noise shielding cover that houses the hydrogen compressing apparatus, and a suction fan. The noise shielding cover has a suction port and an discharge port. The suction fan creates an airflow that flows from the suction port to the discharge port. The airflow prevents hydrogen gas, which has leaked from the hydrogen compressing apparatus body, from remaining in the noise shielding cover. The suction fan is provided in a lower portion of a side wall of the noise shielding cover, and the intake duct is connected to the lower portion of the side wall.

It is preferable for the hydrogen station disclosed in Japanese Patent Application Laid-Open No. 2011-132876 to have a working space, where an operator can perform maintenance, around a housing that houses the compressor. In the hydrogen station disclosed in Japanese Patent Application Laid-Open No. 2011-132876, however, an intake duct is provided in the lower portion of the side wall of the noise shielding cover, which makes it difficult to provide a working space.

Noise generated by driving the compressor leaks from an intake port and an exhaust port. If the intake port and the exhaust port are provided on the lower portion of the housing and if the intake port and the exhaust port are opened downward (toward the ground), some kind of noise shielding measure is necessary.

SUMMARY OF INVENTION

An object of the present invention is to provide a gas supplying apparatus that is provided with a working space for an operator around a housing that houses a compressor or a refrigerator and can suppress noise generated by the compressor or the refrigerator.

A gas supplying apparatus according to one aspect of the present invention is a gas supplying apparatus installed in premises of a facility that supplies hydrogen gas, the gas supplying apparatus including a compressor that compresses the hydrogen gas, a housing that has a compressor space housing the compressor and an exhaust port for discharging air in the compressor space to outside, and an exhaust duct that guides the air in the compressor space to outside of the housing through the exhaust port. The housing includes a perimeter wall surrounding the compressor, and a top wall connected to a top of the perimeter wall. The perimeter wall includes access sections that allow an operator to enter inside the perimeter wall. The exhaust port is provided on at least one of the perimeter wall and the top wall at a location higher than the access sections. The exhaust duct includes a discharge port for discharging air exhausted from the exhaust port to the outside. The discharge port is opened upward or opened downward in an area overlapping the top wall in an up-and-down direction.

DESCRIPTION OF EMBODIMENTS

Figure 1:
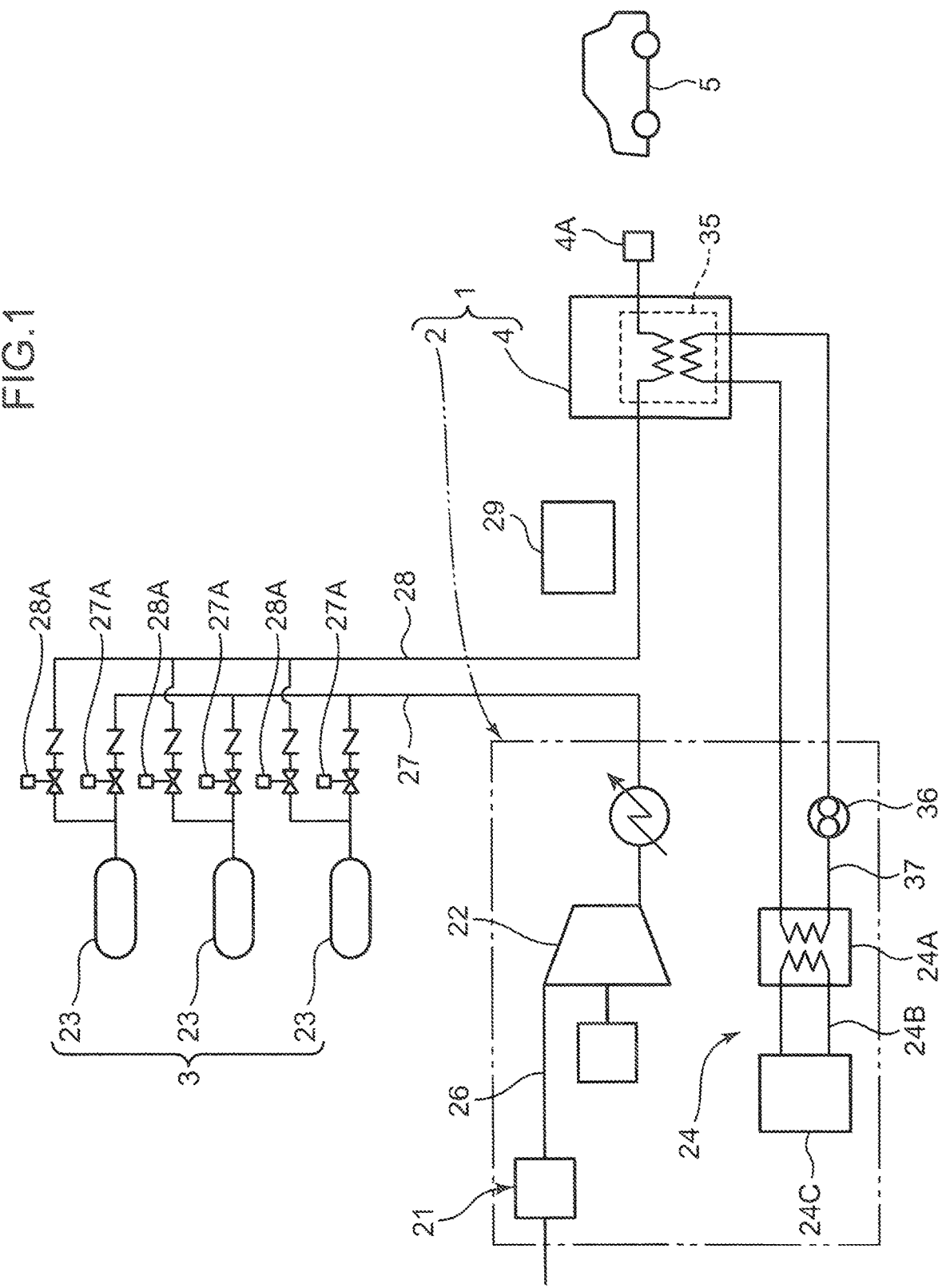
FIG. 1 schematically illustrates a hydrogen station according to one embodiment of the present invention.
Figure 2:
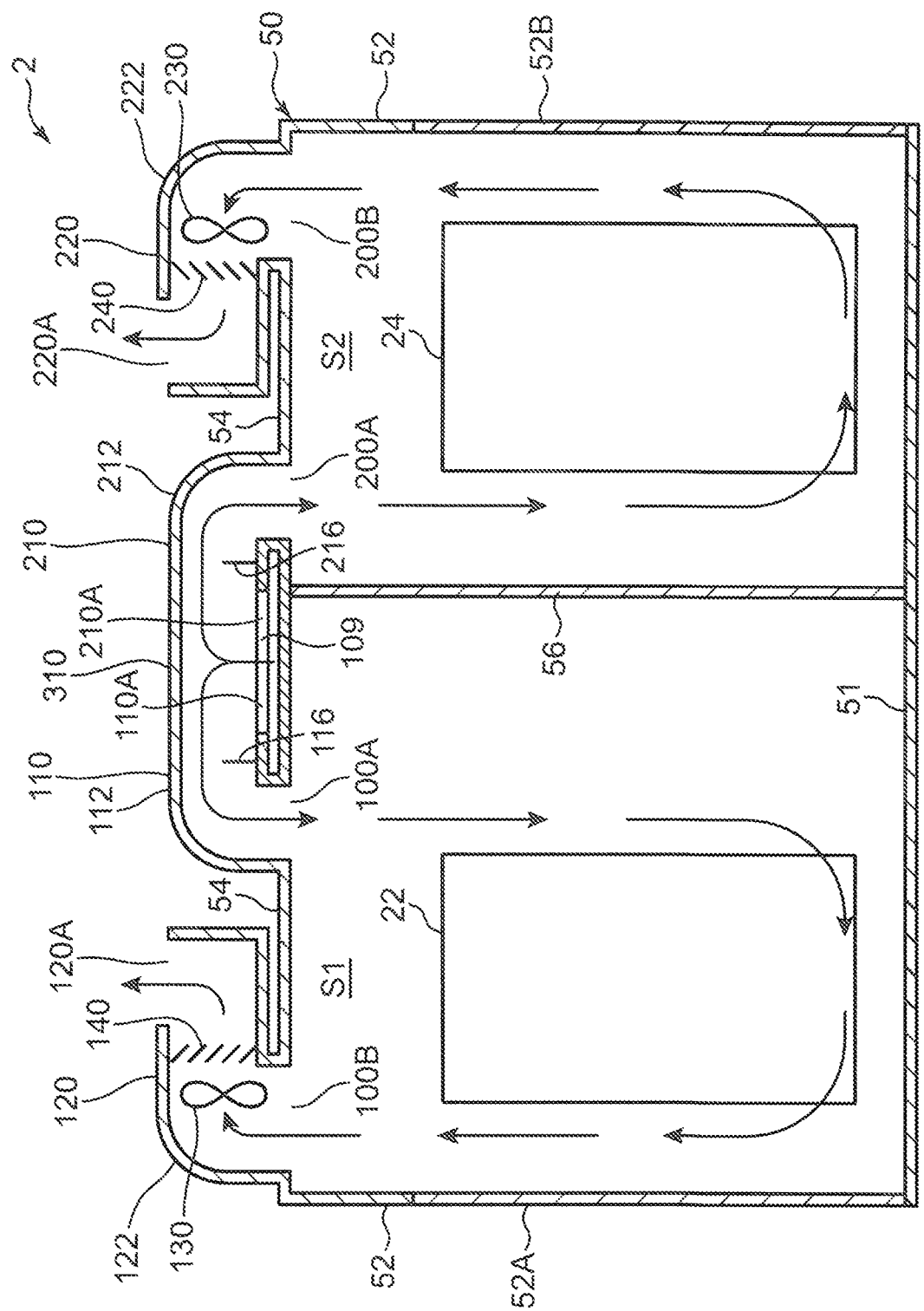
FIG. 2 schematically illustrates a gas supplying apparatus.

A gas supplying apparatus according to one embodiment of the present invention will now be described with reference to FIGS. 1 to 3. FIG. 1 illustrates a hydrogen station 1 including a gas supplying apparatus 2. The hydrogen station 1 is for filling hydrogen gas to a tank of a tank mounted device such as a fuel cell vehicle 5. The hydrogen station 1 will be described with reference to FIG. 1, and then the gas supplying apparatus 2 constituting a part of the hydrogen station 1 will be described in detail.

As illustrated in FIG. 1, the hydrogen station 1 includes the gas supplying apparatus 2, an accumulator unit 3, and a dispenser 4 as main components.

The gas supplying apparatus 2 compresses hydrogen gas to a predetermined high pressure state. The high pressure hydrogen gas generated by the gas supplying apparatus 2 is supplied to the dispenser 4 via the accumulator unit 3. The gas supplying apparatus 2 includes a receiving unit 21 that receives hydrogen gas from a reservoir (not shown), a compressor 22 that compresses the received hydrogen gas to a predetermined high pressure state, a gas in-flow line 27, and a gas out-flow line 28. The dispenser 4 and the receiving unit 21 need not be provided to the gas supplying apparatus 2.

The compressor 22 is, for example, a compressor that operates with a reciprocating motion (reciprocating compressor). Multiple stages of compressing chambers are provided inside the compressor 22. As illustrated in FIG. 1, a downstream end of a receiving line 26 is connected to an inlet of the compressor 22. The hydrogen gas which is not yet compressed is supplied from the receiving unit 21 to the compressor 22 through the receiving line 26. In each compressing chamber, the hydrogen gas suctioned into a cylinder through a suction port is boosted by a reciprocating piston, and the boosted hydrogen gas is exhausted through an discharge port.

For example, three or more stages of compressing chambers are provided inside the compressor 22. The compressor 22 is a large compressor designed to operate in a range where the suction pressure is 1 MPa or lower and the discharge pressure is 80 MPa or higher and to exert a flowrate of about 300 $Nm^3/h$ or more (under a suction pressure of 1 MPa). Thus, a plurality of accumulators 23 can continuously and repetitively be filled with hydrogen gas within a predetermined time (for example, within an hour).

The accumulator unit 3 includes a plurality of (three, in the embodiment) accumulators 23. Each accumulator 23 is a container that stores high pressure hydrogen gas discharged from the compressor 22. Each accumulator 23 has a form of a capsule as illustrated in FIG. 1 and is designed to hold the same pressure (for example, 82 MPa).

The gas in-flow line 27 interconnects the compressor 22 and the accumulator 23, thereby allowing the high pressure hydrogen gas to flow from the compressor 22 to the accumulators 23. Specifically, the upstream end of the gas in-flow line 27 is connected to the discharge port of the compressor 22, and the downstream end of the gas in-flow line 27 branches by a number corresponding to the number of the accumulators 23 (branches into three lines in the embodiment). That is, the gas in-flow line 27 includes a main pipe and a plurality of branch pipes connected to the downstream end of the main pipe. Each branched portion (branch pipe) is connected to the inlet/outlet of the accumulator 23.

As illustrated in FIG. 1, an on-off valve 27A that allows hydrogen gas to flow therein or cuts off the hydrogen gas flow is provided to each branched portion of the gas in-flow line 27. By opening the on-off valve 27A, the high pressure hydrogen gas discharged from the compressor 22 flows into the accumulator 23 through the gas in-flow line 27.

The gas out-flow line 28 is a path for guiding the high pressure hydrogen gas stored in the accumulator 23 to the dispenser 4. Specifically, the upstream portion of the gas out-flow line 28 branches by a number corresponding to the number of the accumulators 23. That is, the gas out-flow line 28 includes a main pipe and a plurality of branch pipes connected to the upstream end of the main pipe. Each branched portion (branch pipe) is connected to a portion further in the downstream along the gas in-flow line 27 than the on-off valve 27A. An on-off valve 28A that allows hydrogen gas to flow therein or cuts off the hydrogen gas flow is provided to each branched portion (branch pipe) of the gas out-flow line 28. By opening the on-off valve 28A with the on-off valve 27A closed, the high pressure hydrogen gas stored in the accumulator 23 is guided to the dispenser 4 through the gas out-flow line 28.

The gas supplying apparatus 2 includes a refrigerator 24 used for cooling the compressed hydrogen gas. The refrigerator 24 includes a coolant path 24B in which the coolant circulates, an evaporating unit 24A, a compressing unit, a condensing unit, and an expansion unit respectively provided on the coolant path 24B. In FIG. 1, the compressing unit, the condensing unit, and the expansion unit are collectively denoted by 24C for convenience.

As illustrated in FIG. 1, the evaporating unit 24A is connected to a brine path 37. The evaporating unit 24A exchanges heat between the coolant flowing in the coolant path 24B and the brine flowing in the brine path 37. The coolant evaporates and the brine is cooled. The cooled brine flows into a pre-cooler 35 provided to the dispenser 4 to exchange heat with the hydrogen gas that has flown into the pre-cooler 35 from the accumulator 23. The compressed hydrogen gas is cooled by the brine. In this manner, the refrigerator 24 cools the brine, which is a secondary coolant, and is indirectly used for cooling the hydrogen gas.

The compressing unit of the refrigerator 24 compresses the gaseous coolant flown out of the evaporating unit 24A. The condensing unit exchanges heat between the coolant compressed by the compressing unit and air, thereby condensing the coolant. The expansion unit expands the liquid coolant flown out of the condensing unit. The coolant that has passed through the expansion unit flows into the evaporating unit 24A.

The gas supplying apparatus 2 further includes a controller 29 that controls the operation of the gas supplying apparatus 2. For example, the controller 29 includes an integrated control-board that controls driving of the compressor 22, opening and closing of the on-off valves 27A and 28A, driving of the refrigerator 24, and driving of the dispenser 4.

The integrated control-board is connected to the components (the compressor 22, the refrigerator 24, the dispenser 4, etc.) not by individual wires but by a field bus or a field network. The integrated control-board may be configured to communicate with a portable manipulating board, such as a tablet computer, over a radio. In such a case, various types of data may be displayed on the portable manipulating board and manipulating commands may be given to the components using the portable manipulating board. By using the portable manipulating board, the operating status of each component can be monitored and each component can be manipulated from any location in the hydrogen station 1.

The dispenser 4 is for feeding high pressure hydrogen gas, which is supplied from the accumulator 23 through the gas out-flow line 28, to the fuel cell vehicle 5. The dispenser 4 includes the pre-cooler 35 for cooling hydrogen gas, and a nozzle 4A for feeding the hydrogen gas cooled by the pre-cooler 35 to the fuel cell vehicle 5. The nozzle 4A has such a shape that can be inserted in a supply port (not shown) of the tank of the fuel cell vehicle 5.

The pre-cooler 35 is, for example, a micro-channel heat exchanger and exchanges heat between the hydrogen gas and the brine as described above. The hydrogen gas cooled by the brine is fed to the tank of the fuel cell vehicle 5 through the nozzle 4A. The brine that has absorbed heat from the hydrogen gas by heat exchange is sent to the evaporating unit 24A by a brine pump 36 and cooled again by the coolant flowing in the coolant path 24B.

As described above, direct heat exchange is not performed between the coolant of the refrigerator 24 and the hydrogen gas, but cold energy generated in the refrigerator 24 is temporarily stored in the secondary coolant, such as brine, to efficiently cool the hydrogen gas. The secondary coolant is not limited to the brine, and for example, liquefied carbon dioxide can be used instead of the brine.

The configuration of the gas supplying apparatus 2 will now be described in detail with reference to FIG. 2. The gas supplying apparatus 2 includes a housing 50, a compressor intake duct (first intake duct) 110, a refrigerator intake duct (second intake duct) 210 which is an additional intake duct, a compressor exhaust duct (first exhaust duct) 120, a refrigerator exhaust duct (second exhaust duct) 220 which is an additional exhaust duct, a compressor rain guard 116, a refrigerator rain guard 216, a compressor fan 130, a compressor regulator 140, a refrigerator fan 230, a refrigerator regulator 240, and a joint 310.

The housing 50 houses the compressor 22 and the refrigerator 24. The housing 50 includes a bottom wall 51, a perimeter wall 52, a top wall 54, and a partitioning wall 56. The partitioning wall 56 partitions the space surrounded by the perimeter wall 52 and the top wall 54 into a compressor space S1 where the compressor 22 is housed and a refrigerator space S2 where the refrigerator 24 is housed. The compressor space S1 of the embodiment is made explosion-proof.

The bottom wall 51 has a form of a flat plate. The compressor 22 and the refrigerator 24 are placed on the bottom wall 51.

The perimeter wall 52 is connected to the rim of the bottom wall 51 and surrounds the compressor 22 and the refrigerator 24. The perimeter wall 52 has a form of a square tube. The perimeter wall 52 has access sections 52A and 52B that allow an operator to enter the compressor space S1 and the refrigerator space S2. The access section 52A is provided on a portion of the perimeter wall 52 that defines the compressor space S1, and the access section 52B is provided on a portion of the perimeter wall 52 that defines the refrigerator space S2. Specifically, the access section 52A is provided on the portion defining the compressor space S1 and in the opposite side of the refrigerator 24 with respect to the compressor 22 in an arrangement direction, which is the direction along which the compressor 22 and the refrigerator 24 are disposed. The access section 52B is provided on the portion defining the refrigerator space S2 and is in the opposite side of the compressor 22 with respect to the refrigerator 24 in the arrangement direction. In the embodiment, doors are used for the access sections 52A and 52B to open and close the opening provided on the perimeter wall 52.

The top wall 54 is connected to the top of the perimeter wall 52. The top wall 54 is provided with a compressor intake port (first intake port) 100A, a compressor exhaust port (first exhaust port) 100B, a refrigerator intake port (second intake port) 200A which is an additional intake port, and a refrigerator exhaust port (second exhaust port) 200B which is an additional exhaust port. The compressor intake port 100A is an opening through which ambient air is taken in to the compressor space S1 from outside the housing 50. The compressor exhaust port 100B is an opening through which the air in the compressor space S1 is discharged to the outside of the housing 50. The refrigerator intake port 200A is an opening through which ambient air is taken in to the refrigerator space S2 from outside the housing 50. The refrigerator exhaust port 200B is an opening through which the air in the refrigerator space S2 is discharged to the outside of the housing 50. The compressor intake port 100A is provided on a portion of the top wall 54 that defines the compressor space S1 (the portion covering the compressor 22 from above) and in the inner side in the arrangement direction. The compressor exhaust port 100B is provided on the portion of the top wall 54 that defines the compressor space S1 and in the outer side in the arrangement direction. That is, the compressor exhaust port 100B is located farther from the refrigerator space S2 and the partitioning wall 56 than the compressor intake port 100A. The refrigerator intake port 200A is provided on a portion of the top wall 54 that defines the refrigerator space S2 (the portion covering the refrigerator 24 from above) and in the inner side in the arrangement direction. The refrigerator exhaust port 200B is provided on the portion of the top wall 54 that defines the refrigerator space S2 and in the outer side in the arrangement direction. That is, the refrigerator exhaust port 200B is located farther from the compressor space S1 and the partitioning wall 56 than the refrigerator intake port 200A.

The partitioning wall 56 has a form of a flat plate. The bottom end of the partitioning wall 56 is connected to the bottom wall 51. The top end of the partitioning wall 56 is connected to a portion of the top wall 54 at a location between the compressor intake port 100A and the refrigerator intake port 200A.

The compressor intake duct 110 (hereinafter simply referred to as "intake duct 110") is for guiding the ambient air suctioned through an ambient air intake port 109 to the compressor intake port 100A. In the embodiment, the ambient air intake port 109 includes a duct inlet 110A of the intake duct 110, and a duct inlet 210A of the refrigerator intake duct 210. The ambient air intake port 109 (that is, the duct inlets 110A and 210A) is opened downward at a position where the intake ducts 110 and 210 overlaps the top wall 54 in the up-and-down direction (that is, in the direction of gravitational force). The intake duct 110 includes an air introducing portion 112 that connects the ambient air intake port 109 and the compressor intake port 100A. The ambient air suctioned through the ambient air intake port 109 is introduced to the compressor intake port 100A via the air introducing portion 112. The air introducing portion 112 is provided above the top wall 54 and exists, longitudinally, within the dimension of the top wall 54. Thus, the intake duct 110 does not exist laterally beyond the top wall 54. The intake duct 110 (air introducing portion 112) extends upward from the top wall 54 (compressor intake port 100A) and then bends to be directed to a lateral direction. The bent portion directed to the lateral direction has a bottom face separated from the top wall 54.

A compressor rain guard 116 (hereinafter simply referred to as "rain guard 116") that prevents entry of rainwater from the ambient air intake port 109 toward the compressor intake port 100A is provided in the air introducing portion 112. The rain guard 116 includes a baffle plate that stands perpendicular to the flow of the suctioned ambient air.

The compressor exhaust duct 120 (hereinafter simply referred to as "exhaust duct 120") is for guiding the air in the compressor space S1 to the outside through the compressor exhaust port 100B. The exhaust duct 120 includes a duct outlet 120A which is a discharge port for discharging the air to the outside, and an air lead-out portion 122 that connects the duct outlet 120A and the compressor exhaust port 100B. The duct outlet 120A is provided on the exhaust duct 120 to open upward in an area overlapping the top wall 54 in the up-and-down direction. The air lead-out portion 122 is provided above the top wall 54 and exists, longitudinally, within the dimension of the top wall 54. That is, the exhaust duct 120 does not exist laterally beyond the top wall 54. The exhaust duct 120 extends upward from the top wall 54 (compressor exhaust port 100B) and then bends to be directed to a lateral direction. The bending portion extends in the horizontal direction toward the intake duct 110. In the air lead-out portion 122, the air exhausted upward from the compressor exhaust port 100B is guided horizontally and then upward to be discharged to the outside through the duct outlet 120A.

The compressor fan 130 is provided in the air lead-out portion 122 of the exhaust duct 120. The compressor fan 130 generates an airflow that flows from the compressor intake port 100A to the compressor exhaust port 100B through the compressor space S1. Specifically, the airflow (indicated by an arrow in FIG. 2) generated by the compressor fan 130 is such that the ambient air taken in through the ambient air intake port 109 flows through the compressor intake port 100A, the bottom portion of the compressor space S1, and the compressor exhaust port 100B to the duct outlet 120A.

The compressor regulator 140 is provided in the exhaust duct 120 and in the downstream of the compressor fan 130. The compressor regulator 140 allows passing of the airflow from the compressor exhaust port 100B to the duct outlet 120A and restricts entry of rainwater from the duct outlet 120A toward the compressor exhaust port 100B. The embodiment uses a louver as the compressor regulator 140. In the exhaust duct 120, the airflow generated by the compressor fan 130 also prevents entry of rainwater.

The refrigerator intake duct 210 (hereinafter simply referred to as "intake duct 210") is for guiding the ambient air taken in through the ambient air intake port 109 to the refrigerator intake port 200A. The intake duct 210 includes an air introducing portion 212 that connects the ambient air intake port 109 and the refrigerator intake port 200A. The ambient air taken in through the ambient air intake port 109 is introduced to the refrigerator intake port 200A via the air introducing portion 212. The air introducing portion 212 is provided above the top wall 54 and exists, longitudinally, within the dimension of the top wall 54. That is, the intake duct 210 does not exist laterally beyond the top wall 54. The intake duct 210 (air introducing portion 212) extends upward from the top wall 54 (refrigerator intake port 200A) and then bends to be directed to a lateral direction. The bent portion directed to the lateral direction has a bottom face separated from the top wall 54.

A refrigerator rain guard 216 (hereinafter simply referred to as "rain guard 216") that prevents entry of rainwater from the ambient air intake port 109 toward the refrigerator intake port 200A is provided in the air introducing portion 212. The rain guard 216 includes a baffle plate that stands perpendicular to the flow of the suctioned ambient air.

The refrigerator exhaust duct 220 (hereinafter simply referred to as "exhaust duct 220") is for guiding the air in the refrigerator space S2 to the outside through the refrigerator exhaust port 200B. The exhaust duct 220 includes a duct outlet 220A which is an additional discharge port for discharging air to the outside, and an air lead-out portion 222 that connects the duct outlet 220A and the refrigerator exhaust port 200B. The duct outlet 220A is provided on the exhaust duct 220 to open upward in an area overlapping the top wall 54 in the up-and-down direction. The air lead-out portion 222 is provided above the top wall 54 and exists, longitudinally, within the dimension of the top wall 54. That is, the exhaust duct 220 does not exist laterally beyond the top wall 54. The exhaust duct 220 extends upward from the top wall 54 (refrigerator exhaust port 200B) and then bends to be directed to a lateral direction. The bending portion extends in the horizontal direction toward the intake duct 210. In the air lead-out portion 222, the air exhausted upward from the refrigerator exhaust port 200B is guided horizontally and then upward to be discharged to the outside through the duct outlet 220A.

Figure 3:
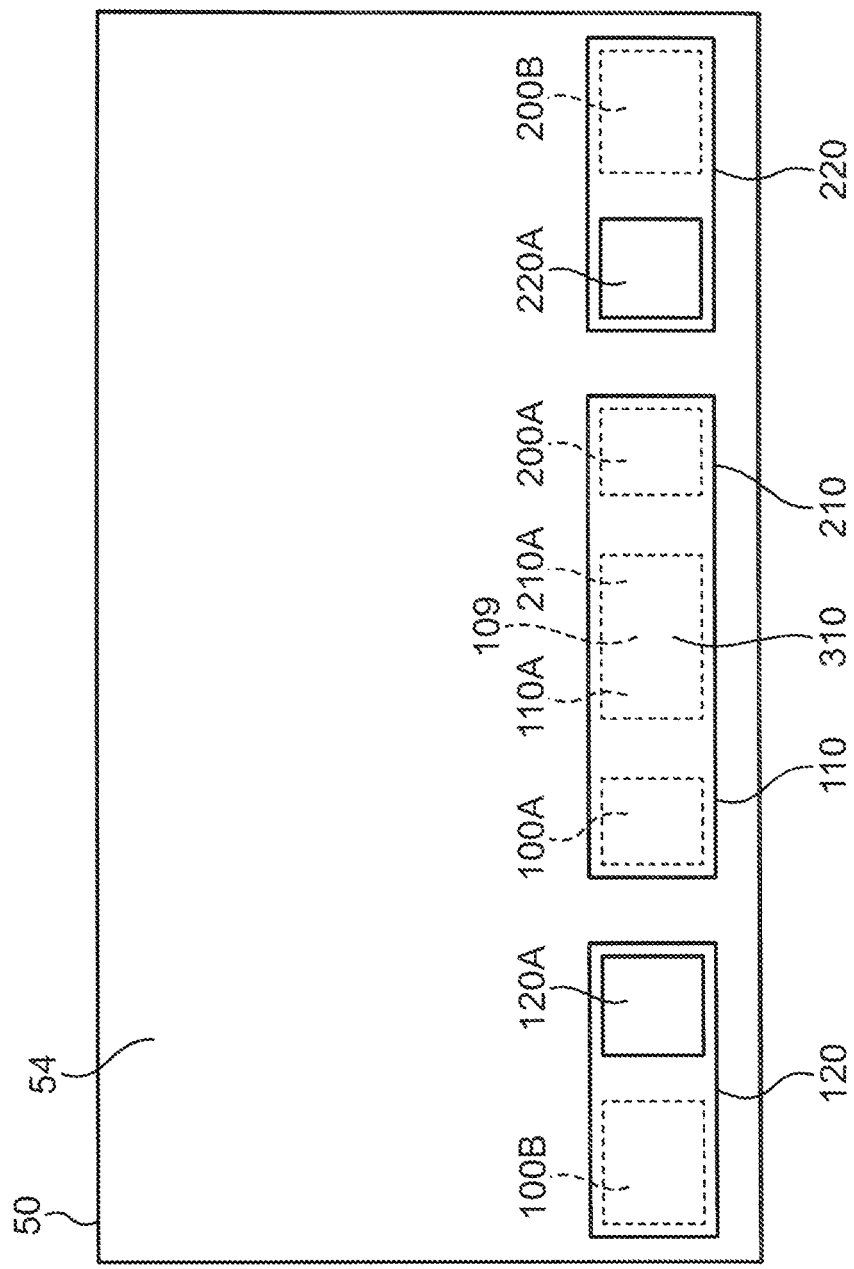
FIG. 3 is a plan view schematically illustrating the gas supplying apparatus.

In the embodiment, the exhaust duct 120, the intake duct 110, the intake duct 210, and the exhaust duct 220 are arranged in line on the top wall 54 as illustrated in FIG. 3. On the top wall 54, there is a sufficient space in the direction perpendicular to the arrangement direction. This provides a sufficient working space for an operator or a sufficient space for installing other devices on the top wall 54.

The refrigerator fan 230 is provided in the air lead-out portion 222 of the exhaust duct 220. The airflow (the airflow indicated by an arrow in FIG. 2) generated by the refrigerator fan 230 is such that the ambient air taken in through the ambient air intake port 109 flows through the refrigerator intake port 200A, the bottom portion of the refrigerator space S2, and the refrigerator exhaust port 200B to the duct outlet 220A.

The refrigerator regulator 240 is provided in the exhaust duct 220 and in the downstream of the refrigerator fan 230. The refrigerator regulator 240 allows passing of the airflow from the refrigerator exhaust port 200B to the duct outlet 220A and restricts entry of rainwater from the duct outlet 220A toward the refrigerator exhaust port 200B. The embodiment uses a louver as the refrigerator regulator 240. In the exhaust duct 220, the airflow generated by the refrigerator fan 230 also prevents entry of rainwater.

The intake duct 110 and the intake duct 210 are joined and thereby the duct inlet 110A and the additional duct inlet 210A form a single ambient air intake port 109. The joined section is referred to as a joint 310. With the joint 310 joining the intake duct 110 and the intake duct 210, the required space for installing the intake duct 110 and the additional intake duct 210 is small compared to a structure in which the intake duct 110 and the intake duct 210 are separately provided. The bottom face of the intake duct 110 and the intake duct 210 joined by the joint 310 is separated from the top wall 54. The ambient air intake port 109 is provided on the bottom face separated from the top wall 54.

As described above, the gas supplying apparatus 2 of the embodiment includes the intake ports 100A and 200A and the exhaust ports 100B and 200B provided on the top wall 54. This allows a sufficient working space to be provided around the perimeter wall 52 (in particular, around the access sections 52A and 52B). Since the duct outlets 120A and 220A of the exhaust ducts 120 and 220 are opened upward, propagation of the noise generated by driving the compressor 22 to the surrounding of the housing 50 is suppressed. The ambient air intake port 109 (that is, the duct inlets 110A and 210A) is opened downward in the area overlapping the top wall 54 in the up-and-down direction. The noise emitted from the ambient air intake port 109 is reflected on the top wall 54 and likely to propagate to the upper side of the housing 50. This effectively reduces noise around the housing 50.

Directing the ambient air intake port 109 downward prevents rainwater from entering the compressor intake port 100A and the refrigerator intake port 200A. Providing the duct inlets of the intake ducts 110 and 210 as a single ambient air intake port 109 further reliably prevents rainwater from entering the compressor intake port 100A and the refrigerator intake port 200A.

Furthermore, housing the compressor 22 and the refrigerator 24 in a single housing 50 reduces the area for installing the compressor 22 and the refrigerator 24.

The intake ducts 110 and 210 and the exhaust ducts 120 and 220 are each disposed so that the entire longitudinal dimension thereof overlaps the top wall 54 in the up-and-down direction. Thus, it is not necessary to secure a large installation space for the gas supplying apparatus 2.

Since the air lead-out portion 122 horizontally extends toward the intake duct 210, a large installation space for the exhaust duct 120 is not necessary to be provided on the limited space of the top wall 54. The same can be said for the air lead-out portion 222 of the exhaust duct 220.

It should be construed that the embodiments are disclosed herein by all means of illustration, not by means of limitation. The scope of the present invention is defined by the claims, not by the description on the embodiments, and includes all alterations and modifications within the scope of the meanings equivalent to the claims and within the scope of the claims.

Figure 4:
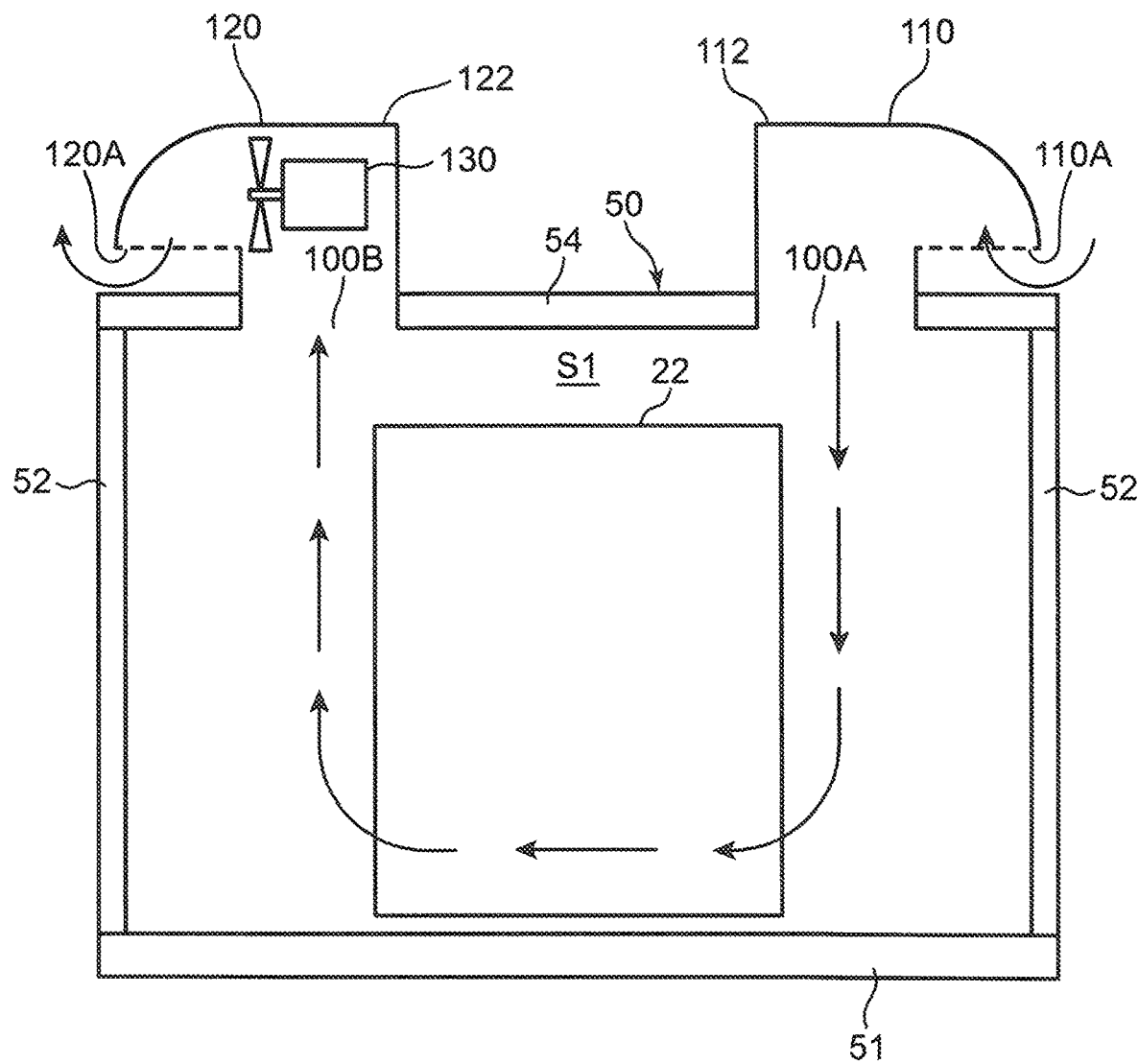
FIG. 4 schematically illustrates an exemplary modification of the gas supplying apparatus.

For example, the duct outlet 120A of the exhaust duct 120 may be opened downward at a location overlapping the top wall 54 in the up-and-down direction as illustrated in FIG. 4. That is, the exhaust duct 120 having the duct outlet 120A opened downward may be provided not to exist laterally beyond the top wall 54. In such a configuration, the noise emitted from the duct outlet 120A can effectively be suppressed. FIG. 4 is a schematic view when the gas supplying apparatus 2 is seen along the arrangement direction from the outer side of the access section 52A. The air lead-out portion 122 may guide the gas, which is exhausted upward through the compressor exhaust port 100B, to the side opposite the intake duct 110. The duct inlet 110A of the embodiment may be opened to the horizontal direction as long as the duct inlet 110A is disposed at a location overlapping the top wall 54 in the up-and-down direction. The same can be said for the duct inlet 210A of the refrigerator intake duct 210, the duct outlet 220A of the refrigerator exhaust duct 220, and the air lead-out portion 222.

The compressor intake duct 110 and the refrigerator intake duct 210 of the embodiment may be separated. That is, the duct inlet 110A of the intake duct 110 and the duct inlet 210A of the intake duct 210 may be provided separately.

Figure 5:
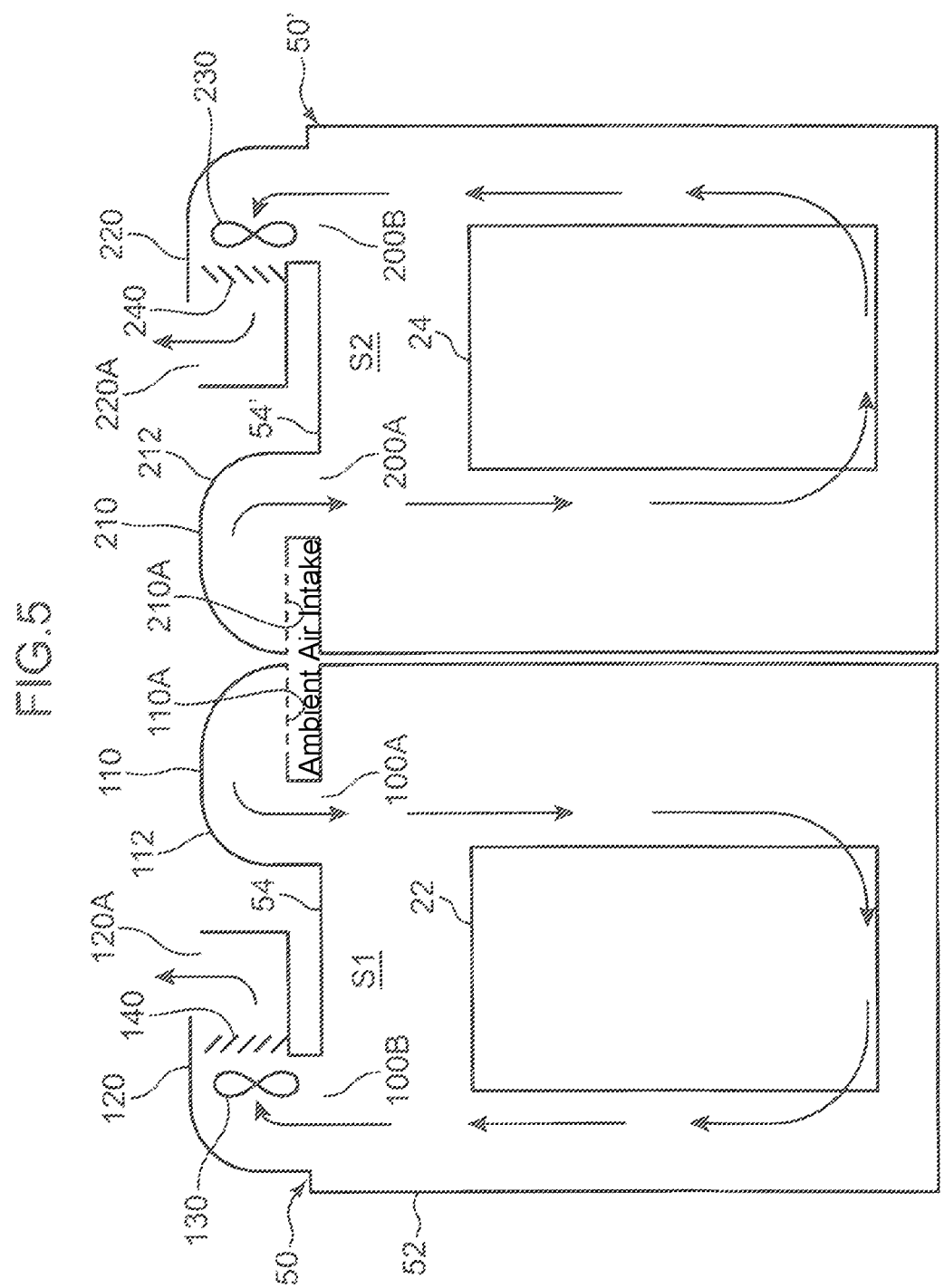
FIG. 5 schematically illustrates another exemplary modification of the gas supplying apparatus.

The compressor intake duct 110 and the compressor exhaust duct 120 described in the embodiment may be used for a housing that houses only the compressor 22. In this case, as illustrated in FIG. 5, the refrigerator 24 is housed in a housing 50' provided separately from the housing 50 that houses only the compressor 22. A refrigerator intake duct 210 and a refrigerator exhaust duct 220 are provided on the housing 50'. In this case, the compressor intake duct 110 and the refrigerator intake duct 210 are provided separately. The compressor intake duct 110 exists, longitudinally, within the dimension of the top wall 54 of the housing 50. The refrigerator intake duct 210 exists, longitudinally, within the dimension of a top wall 54' of the housing 50'. The duct outlet 120A is opened upward or opened downward in an area overlapping the top wall 54 in the up-and-down direction. The duct inlet 110A of the intake duct 110 is disposed in an area overlapping the top wall 54 in the up-and-down direction. The exhaust duct 120 exists, longitudinally, within the dimension of the top wall 54 of the housing 50.

Figure 6:
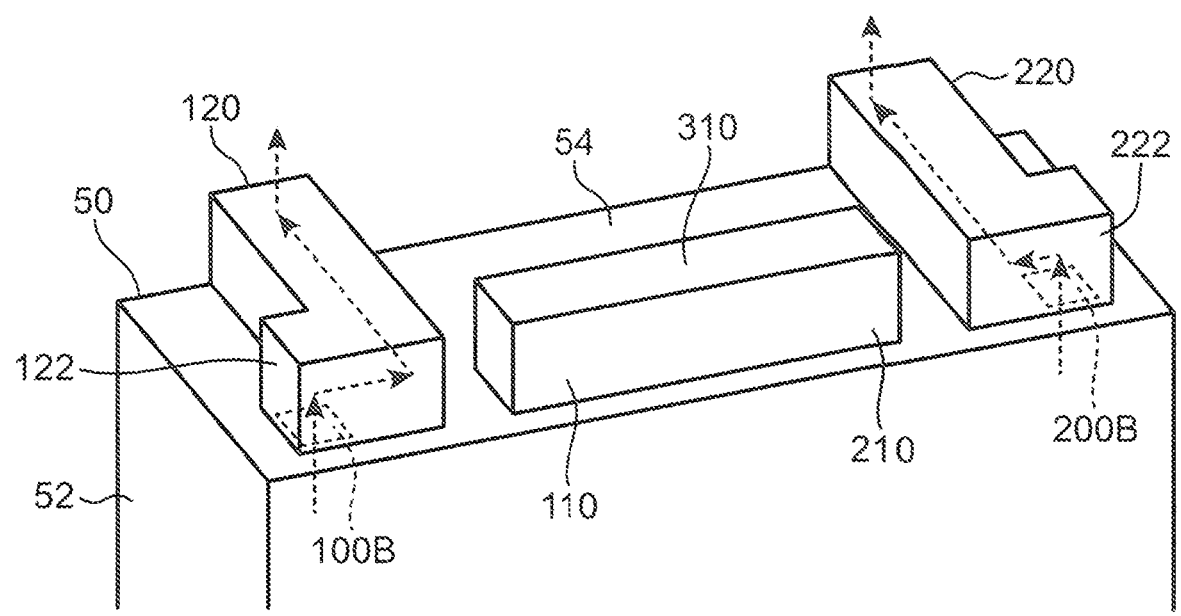
FIG. 6 schematically illustrates yet another exemplary modification of the gas supplying apparatus.

As illustrated in FIG. 6, the air lead-out portion 122 of the compressor exhaust duct 120 provided on the top wall 54 may have a bent section and an extending section. The same can be said for the air lead-out portion 222 of the refrigerator exhaust duct 220. With the air lead-out portions 122 and 222 each bent along a horizontal plane, the noise from the exhaust ducts 120 and 220 is further reduced. Providing a sound absorbing material on the inner face of the exhaust ducts 120 and 220 further suppresses the noise. The shape of the air lead-out portion may be different from that illustrated in FIG. 6.

To avoid interference with a member provided on the top wall 54, the air lead-out portions 122 and 222 may be disposed with a portion laterally existing beyond the top wall 54. In such a case, noise can still be reduced by opening the duct outlets 120A and 220A upward or downward in an area overlapping the top wall 54 in the up-and-down direction.

The compressor exhaust port 100B may be provided at any place on the perimeter wall 52 at a location higher than the access section 52A. Likewise, the refrigerator exhaust port 200B may be provided at any place on the perimeter wall 52 at a location higher than the access section 52B. The exhaust port 100B may be provided both on the perimeter wall 52, at a location higher than the access section 52A, and on the top wall 54.

In the embodiment, the compressor rain guard 116 may be provided with a baffle plate of a different shape as long as it prevents entry of rainwater. The same can be said for the refrigerator rain guard 216.

The embodiment will now be summarized.

(1) The embodiment, which is the gas supplying apparatus installed in premises of a facility that supplies hydrogen gas, includes a compressor that compresses the hydrogen gas, a housing that has a compressor space housing the compressor and an exhaust port for discharging air in the compressor space to outside, and an exhaust duct that guides the air in the compressor space to outside of the housing through the exhaust port. The housing includes a perimeter wall surrounding the compressor, and a top wall connected to a top of the perimeter wall. The perimeter wall includes access sections that allow an operator to enter inside the perimeter wall. The exhaust port is provided on at least one of the perimeter wall and the top wall at a location higher than the access sections. The exhaust duct includes a discharge port for discharging air exhausted from the exhaust port to the outside. The discharge port is opened upward or opened downward in an area overlapping the top wall in an up-and-down direction.

The gas supplying apparatus is such that the exhaust port is provided on at least one of the perimeter wall and the top wall at a portion higher than the access section. This allows a sufficient working space to be provided around the perimeter wall in a portion below the exhaust port. The discharge port of the exhaust duct is opened upward or opened downward in an area overlapping the top wall in the up-and-down direction. This suppresses the noise generated by driving the compressor.

(2) The gas supplying apparatus is such that an intake port that takes in ambient air to the compressor space may be provided on at least one of the perimeter wall and the top wall at a location higher than the access section. The gas supplying apparatus may further include an intake duct that guides ambient air into the compressor space through the intake port. The duct inlet of the intake duct is disposed in an area overlapping the top wall in the up-and-down direction.

In this embodiment, the noise generated by the compressor and emitted downward from the duct inlet is reflected on the top wall. This suppresses propagation of the noise to the surrounding of the housing.

(3) The duct inlet may be opened downward at a location overlapping the top wall in the up-and-down direction.

In this embodiment, the noise emitted from the duct inlet is reflected on the top wall, and thus propagation of the noise to the surrounding of the housing is further reliably suppressed.

(4) The exhaust port of the gas supplying apparatus may be provided on the top wall. The exhaust duct may further include an air lead-out portion that extends in a horizontal direction to connect the exhaust port and the discharge port. The air lead-out portion may be provided above the top wall and exists, longitudinally, within the dimension of the top wall.

In this embodiment, it is not necessary to secure a large installation space for the gas supplying apparatus including the exhaust duct.

(5) The gas supplying apparatus may further include a refrigerator that cools hydrogen gas that is discharged from the compressor and is supplied to a dispenser for feeding the hydrogen gas to a tank of a tank mounted device, an additional exhaust duct that is provided separately from the exhaust duct and connected to the housing, and an additional intake duct that is provided separately from the intake duct and connected to the housing. The housing may further include a partitioning wall that partitions a space surrounded by the perimeter wall and the top wall into the compressor space and a refrigerator space in which the refrigerator is housed, an additional exhaust port that is provided separately from the exhaust port and for discharging air in the refrigerator space to outside, and an additional intake port that is provided separately from the intake port and for taking in ambient air to the refrigerator. The additional exhaust port and the additional intake port may be provided on a portion of the top wall that defines the refrigerator space. The additional exhaust duct may include an additional discharge port for discharging air, exhausted from the additional exhaust port, to the outside. The additional discharge port is opened upward or opened downward in an area overlapping the top wall in the up-and-down direction. The additional intake duct may include an additional duct inlet for taking in ambient air to be supplied to the additional intake port. The additional duct inlet may be provided in an area overlapping the top wall in the up-and-down direction.

In this embodiment, the compressor and the refrigerator are housed in a single housing, and therefore the installation area for the compressor and the refrigerator is smaller than that of a configuration in which the compressor and the refrigerator are housed in different housings. The housing has the partitioning wall, so that the compressor space and the refrigerator space can be configured differently. For example, only the compressor space may be made explosion-proof. The additional discharge port is opened upward or opened downward in an area overlapping the top wall in the up-and-down direction. At the same time, the additional duct inlet is provided in an area overlapping the top wall in the up-and-down direction. This suppresses propagation of noise generated by driving the compressor and the refrigerator to the surrounding of the housing.

(6) The gas supplying apparatus may further include a joint that joins the duct inlet and the additional duct inlet to form a single ambient air intake port.

In this embodiment, the space required for installing the intake duct can be made small compared to a structure in which the intake duct and the additional intake duct are separated. This further reliably prevents water from entering the duct inlet.

(7) The exhaust duct, the intake duct, the additional intake duct, and the additional exhaust duct may be disposed in line.

In this embodiment, a sufficient working space for an operator or a sufficient space for installing other devices on the top wall can be provided.

(8) The gas supplying apparatus may further include a compressor rain guard that is provided in the intake duct to prevent entry of rainwater from the duct inlet toward the intake port, and a refrigerator rain guard that is provided in the additional intake duct to prevent entry of rainwater from the additional duct inlet toward the additional intake port.

In this embodiment, water is further reliably prevented from entering the intake ports.

(9) The gas supplying apparatus may further include a compressor fan that is provided in the exhaust duct to generate an airflow flowing from the intake port to the exhaust port, and a refrigerator fan that is provided in the additional exhaust duct to generate an airflow flowing from the additional intake port to the additional exhaust port.

In this embodiment, rainwater entering the exhaust duct along with the airflow generated by the fan can be prevented. In particular, this configuration is preferable if the discharge port and the additional discharge port are opened upward.

(10) The gas supplying apparatus may further include a compressor regulator that is provided in the exhaust duct and in downstream of the compressor fan to allow passing of the airflow from the exhaust port to the discharge port and restrict entry of rainwater from the discharge port toward the exhaust port, and a refrigerator regulator that is provided in the additional exhaust duct and in downstream of the refrigerator fan to allow passing of the airflow from the additional exhaust port to the additional discharge port and restrict entry of rainwater from the additional discharge port toward the additional exhaust port.

In this embodiment, water (such as rainwater) is further reliably prevented from entering the exhaust ports.

As described above, the gas supplying apparatus that is provided with a working space for an operator around a housing that houses the compressor or the refrigerator and reduces the noise generated by the compressor or the refrigerator can be provided.

This application is based on Japanese Patent application No. 2017-212673 filed in Japan Patent Office on Nov. 2, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A gas supplying apparatus provided in premises of a facility that supplies hydrogen gas, the gas supplying apparatus comprising:
    a compressor that compresses the hydrogen gas;
    a housing that has a compressor space housing the compressor an exhaust port for discharging air in the compressor space to outside, and an intake port to take ambient air into the compressor space;
    an exhaust duct that guides air in the compressor space to outside of the housing through the exhaust port; and
    a refrigerator for cooling the hydrogen gas discharged from the compressor and supplied to a dispenser that feeds the hydrogen gas to a tank of a tank mounted device, wherein
    the housing includes
        a perimeter wall surrounding the compressor,
        a top wall connected to a top of the perimeter wall,
        a partitioning wall that partitions a space surrounded by the perimeter wall and the top wall into the compressor space and a refrigerator space in which the refrigerator is housed,
        an additional exhaust port that is provided separately from the exhaust port and for discharging air in the refrigerator space to outside, and
        an additional intake port that is provided separately from the intake port and for taking in ambient air to the refrigerator space, the additional exhaust port and the additional intake port being provided on a portion of the top wall defining the refrigerator space,
    the perimeter wall includes access sections that allow an operator to enter inside the perimeter wall,
    the exhaust port is provided on at least one of the perimeter wall and the top wall, the exhaust port being provided at a location higher than the access sections,
    the exhaust duct includes a discharge port for discharging air exhausted from the exhaust port to the outside, and includes an air lead-out portion that connects the exhaust port and the discharge port,
    and
    the discharge port is opened upward in an area overlapping the top wall in an up-and-down direction or opened downward in the area overlapping the top wall in the up-and-down direction.

2. The gas supplying apparatus according to claim 1, further comprising: an intake duct that has a duct inlet and guides ambient air to the compressor space through the intake port, wherein the intake port is provided on at least one of the perimeter wall and the top wall at another location higher than the access sections, and the duct inlet of the intake duct is disposed in the area overlapping the top wall in the up-and-down direction.

3. The gas supplying apparatus according to claim 2, wherein
the duct inlet is opened downward at a location overlapping the top wall in the up-and-down direction.

4. A gas supplying apparatus provided in premises of a facility that supplies hydrogen gas, the gas supplying apparatus comprising:
a compressor that compresses the hydrogen gas;
a housing that has a compressor space housing the compressor and an exhaust port for discharging air in the compressor space to outside;
an exhaust duct that guides air in the compressor space to outside of the housing through the exhaust port;
a refrigerator for cooling the hydrogen gas that is discharged from the compressor and supplied to a dispenser that feeds the hydrogen gas to a tank of a tank mounted device;
an additional exhaust duct that is provided separately from the exhaust duct and connected to the housing; and
an additional intake duct that is provided separately from an intake duct and connected to the housing, wherein
the housing includes a perimeter wall surrounding the compressor, and a top wall connected to a top of the perimeter wall,
the perimeter wall includes access sections that allow an operator to enter inside the perimeter wall,
the exhaust port is provided on at least one of the perimeter wall and the top wall, the exhaust port being provided at a location higher than the access sections,
the exhaust duct includes a discharge port for discharging air exhausted from the exhaust port to the outside,
the discharge port is opened upward in an area overlapping the top wall in an up-and-down direction or opened downward in the area overlapping the top wall in the up-and-down direction,
the housing includes
a partitioning wall that partitions a space surrounded by the perimeter wall and the top wall into the compressor space and a refrigerator space in which the refrigerator is housed,
an additional exhaust port that is provided separately from the exhaust port and for discharging air in the refrigerator space to outside, and
an additional intake port that is provided separately from an intake port and for taking in ambient air to the refrigerator space,
the additional exhaust port and the additional intake port are provided on a portion of the top wall, the portion defining the refrigerator space,
the additional exhaust duct includes an additional discharge port for discharging air exhausted from the additional exhaust port to the outside,
the additional discharge port is opened upward in the area overlapping the top wall in the up-and-down direction or opened downward in the area overlapping the top wall in the up-and-down direction,
the additional intake duct includes an additional duct inlet, and
the additional duct inlet is provided in the area overlapping the top wall in the up-and-down direction.

5. The gas supplying apparatus according to claim 4, further comprising
a joint that joins a duct inlet and the additional duct inlet to form a single ambient air intake port.

6. The gas supplying apparatus according to claim 4, wherein
the exhaust duct, the intake duct, the additional intake duct, and the additional exhaust duct are disposed in line.

7. The gas supplying apparatus according to claim 4, further comprising:
a compressor rain guard that is provided in the intake duct to prevent entry of rainwater from a duct inlet toward the intake port; and
a refrigerator rain guard that is provided in the additional intake duct to prevent entry of rainwater from the additional duct inlet toward the additional intake port.

8. The gas supplying apparatus according to claim 4, further comprising:
a compressor fan that is provided in the exhaust duct to generate an airflow flowing from the intake port to the exhaust port; and
a refrigerator fan that is provided in the additional exhaust duct to generate an airflow flowing from the additional intake port to the additional exhaust port.

9. The gas supplying apparatus according to claim 8, further comprising:
a compressor regulator that is provided in the exhaust duct and downstream of the compressor fan to allow passing of the airflow from the exhaust port to the discharge port and restrict entry of rainwater from the discharge port toward the exhaust port; and
a refrigerator regulator that is provided in the additional exhaust duct and downstream of the refrigerator fan to allow passing of the airflow from the additional exhaust port to the additional discharge port and restrict entry of rainwater from the additional discharge port toward the additional exhaust port.

10. A gas supplying apparatus provided in premises of a facility that supplies hydrogen gas, the gas supplying apparatus comprising:
a compressor that compresses hydrogen gas;
a refrigerator for cooling the hydrogen gas that is discharged from the compressor and supplied to a dispenser that feeds the hydrogen gas to a tank of a tank mounted device;
a housing that includes
a partitioning wall that partitions a space surrounded by the housing into a compressor space in which the compressor is housed and a refrigerator space in which the refrigerator is housed,
a top wall on which a first intake port, a first exhaust port, a second intake port, and a second exhaust port are provided, the first intake port being used for taking in ambient air to the compressor space, the first exhaust port being used for discharging air in the compressor space to outside, the second intake port being used for taking in ambient air to the refrigerator space, the second exhaust port being used for discharging air in the refrigerator space to the outside, the second intake port and second exhaust port being provided on a portion of the top wall defining the refrigerator space;
a first intake duct that guides ambient air into the compressor space through the first intake port;
a first exhaust duct that guides air in the compressor space to the outside of the housing through the first exhaust port;
a second intake duct that guides ambient air into the refrigerator space through the second intake port; and a second exhaust duct that guides air in the refrigerator space to the outside of the housing through the second exhaust port, wherein the first exhaust duct includes an air lead-out portion that extends horizontally along a surface of the top wall, a compressor fan is disposed in the air lead-out portion so that an airflow generated by the compressor fan flows along the air lead-out portion, and the first intake duct, the first exhaust duct, the second intake duct, and the second exhaust duct are each provided not to laterally extend beyond the top wall.

11. The gas supplying apparatus according to claim 10, wherein the first intake duct includes a first duct inlet, the second intake duct includes a second duct inlet, and the first intake duct and the second intake duct are joined such that the first duct inlet and the second duct inlet form a single opening.

\* \* \* \* \*